United States Patent [19]

Iskiw

[11] 4,432,117
[45] Feb. 21, 1984

[54] FISH SCALER

[76] Inventor: Metro Iskiw, 9511-75 St., Edmonton, Alberta, Canada, T6C 2H8

[21] Appl. No.: 342,183

[22] Filed: Jan. 25, 1982

[30] Foreign Application Priority Data

Oct. 8, 1981 [CA] Canada .................................. 387576

[51] Int. Cl.³ .......................................... A22C 25/02
[52] U.S. Cl. ...................................... 17/66; 30/169; 30/272 A
[58] Field of Search ................. 30/169, 272 A; 17/19, 17/16, 66

[56] References Cited

U.S. PATENT DOCUMENTS

| D. 205,884 | 10/1966 | Canion | 17/66 X |
| 2,338,647 | 1/1944 | Koon | 30/169 X |
| 2,933,914 | 4/1960 | Palmer | 30/169 X |
| 3,234,649 | 2/1966 | Preble et al. | 30/272 A |
| 3,316,636 | 5/1967 | Raper, Jr. et al. | 30/272 A X |
| 3,417,469 | 12/1968 | Cousins et al. | 30/272 A |
| 3,683,496 | 8/1972 | Johnson | 30/169 |

FOREIGN PATENT DOCUMENTS 1177046  8/1964  Fed. Rep. of Germany ........ 30/169

Primary Examiner—Willie G. Abercrombie
Attorney, Agent, or Firm—Harold H. Dutton, Jr.; George H. Dunsmuir

[57] ABSTRACT

A manually operated fish scaler includes a casing containing an electric motor, a transmission for changing the rotary motion of the motor drive shaft into longitudinal, reciprocating motion and a blade holder for connecting the transmission to a blade, which includes a transversely extending cutting edge for dislodging scales from a fish.

5 Claims, 11 Drawing Figures

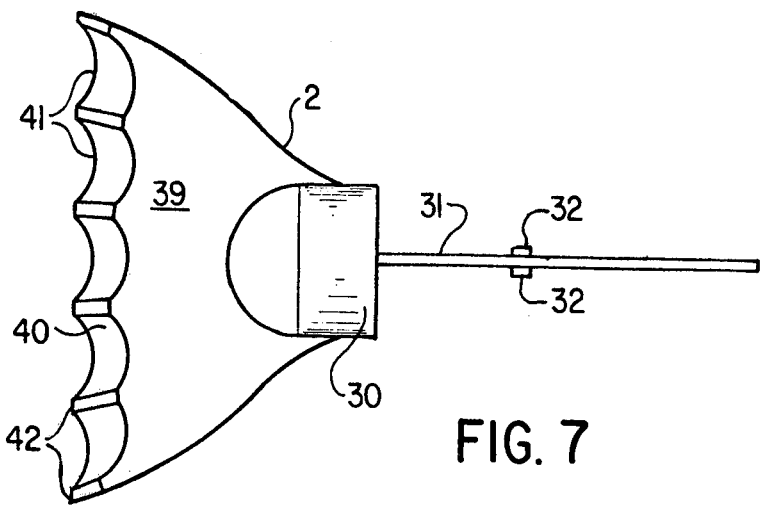
FIG. 7
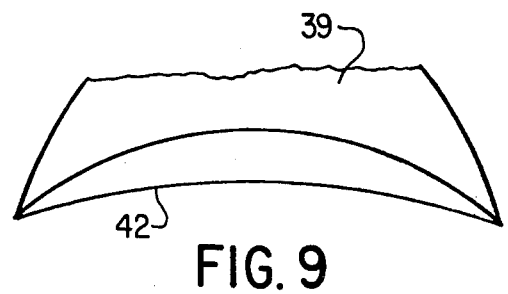
FIG. 9
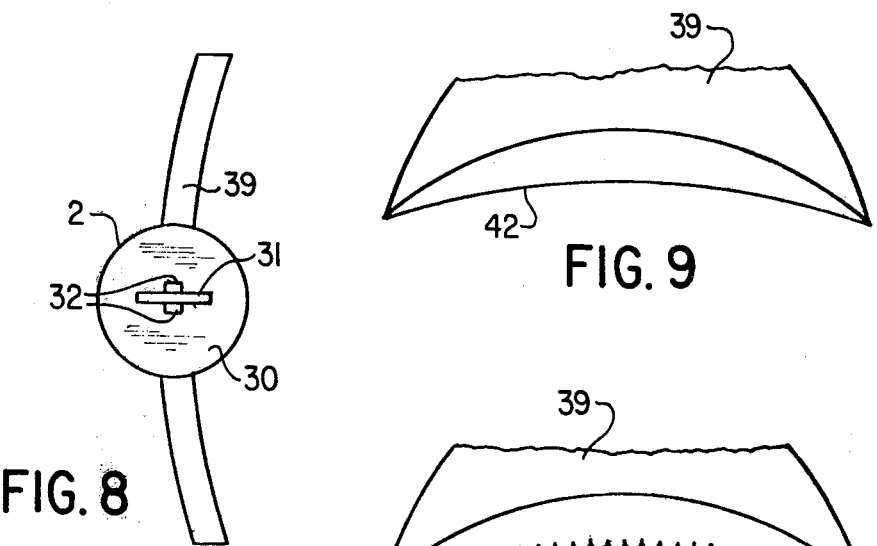
FIG. 8
FIG. 10
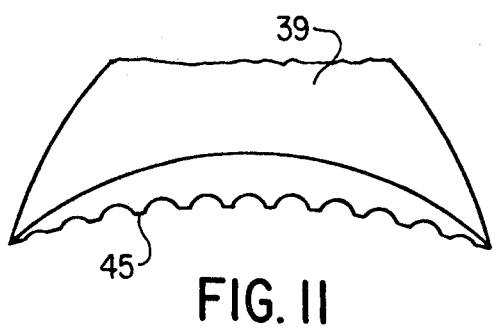
FIG. 11

FISH SCALER

BACKGROUND OF THE INVENTION

This invention relates to a fish scaler, and in particular to a motorized fish scaler.

In general, motorized, manually operated fish scalers include motors for driving a shaft, and a toothed body or blade on the outer end of the shaft for engaging and removing fish scales. Examples of such rotary fish scalers are found in U.S. Pat. Nos. 2,835,919, issued to B. E. Colburn et al on May 27, 1958; 3,072,956, issued to W. Olrich on Jan. 15, 1963; and 3,328,834, issued to R. A. Pulcifer on July 4, 1967. Not only do such rotary fish scalers tend to spray scales over a large area, but the scalers are inefficient in terms of energy use. With many rotary scalers, a relatively small area of the blade contacts the fish at any one time.

The object of the present invention is to alleviate the above mentioned problems by providing a fish scaler which relies on reciprocating motion, and the blade of which is designed to contact a relative large area of a fish.

SUMMARY OF THE INVENTION

Accordingly, the present invention relates to a fish scaler comprising a casing; motor means in said casing; shaft means in said casing for driving by said motor means; transmission means in said casing for changing rotary motion of said shaft into longitudinal reciprocating motion; blade holder means connected to said transmission means; blade means for mounting in said blade holder means, whereby actuation of said motor results in reciprocating motion of said blade means; and a cutting edge on said blade means extending normal to the direction of said longitudinal reciprocating motion.

BRIEF DESCRIPTION OF THE DRAWINGS

The invention will now be described in greater detail with reference to the accompanying drawings, which illustrate a preferred embodiment of the invention, and wherein:

FIG. 7 is a plan view of the blade of the scaler of FIGS. 1 to 5;

FIG. 8 is an end view of the blade of FIG. 6, taken from the right of FIG. 7; and FIGS. 9 to 11 are plan views of alternate cutting edges for use on the blade of the scaler.

DESCRIPTION OF THE PREFERRED EMBODIMENT(S)

Figure 1:
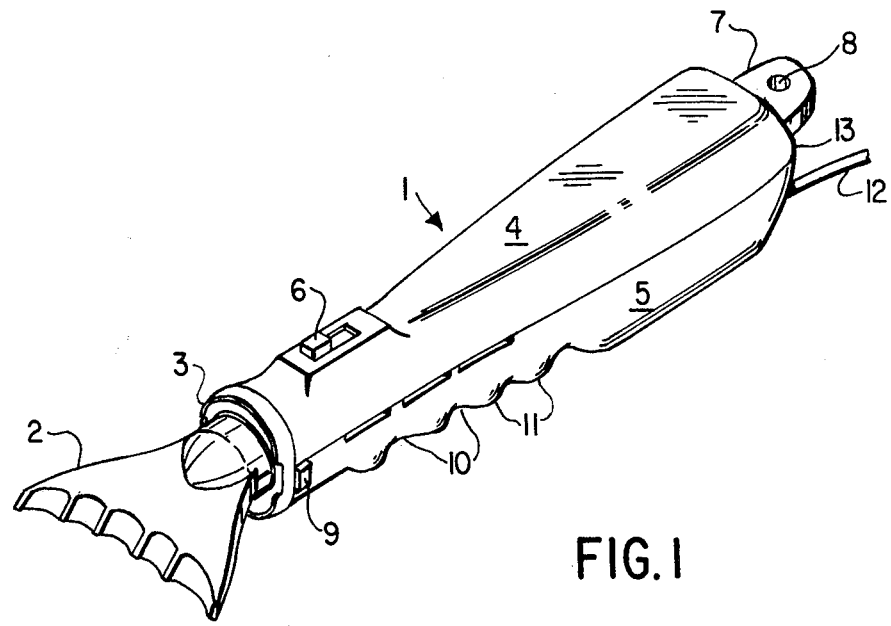
FIG. 1 is a perspective view from above and one end of a fish scaler in accordance with the present invention.
Figure 2:
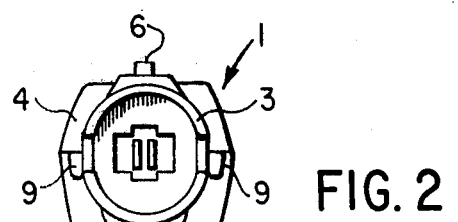
FIG. 2 is an end view of the blade end of the casing of the scaler of FIG. 1, with the blade removed.

With reference to the drawings, and in particular to FIGS. 1 to 6, the fish scaler of the present invention includes an elongated casing generally indicated at 1, and a blade 2 extending outwardly from one end 3 of the casing 1. The casing 1 is formed of plastic, and includes upper and lower portions 4 and 5, respectively interconnected in the usual manner by lugs and recesses or screws (not shown). A switch (not shown) is provided in the top of the casing 1 for operation by a push button 6. A lug 7 is provided on the rear end of the upper portion 4 of the casing 1, with a hole 8 therein so that the scaler can be hung from a hook or nail. Blade release buttons 9 extend outwardly from the bottom portion 5 of the casing 1 near the front end 3 thereof. Alternating concave grooves 10 and convex ridges 11 extending transversely of the bottom portion 5 of the casing 1 near the front end thereof define finger grips, facilitating manual use of the scaler. Electrical power is supplied to the casing 1 through a cord 12.

Figure 3:
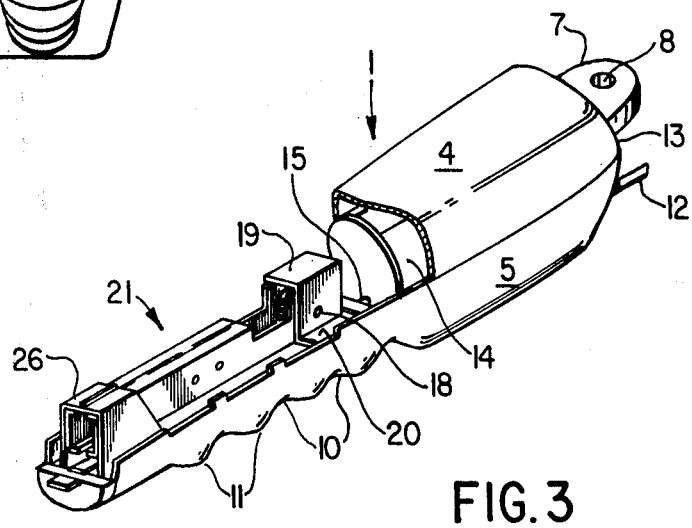
FIG. 3 is a partly sectioned perspective view of the scaler of FIG. 1, with the blade removed.
Figure 4:
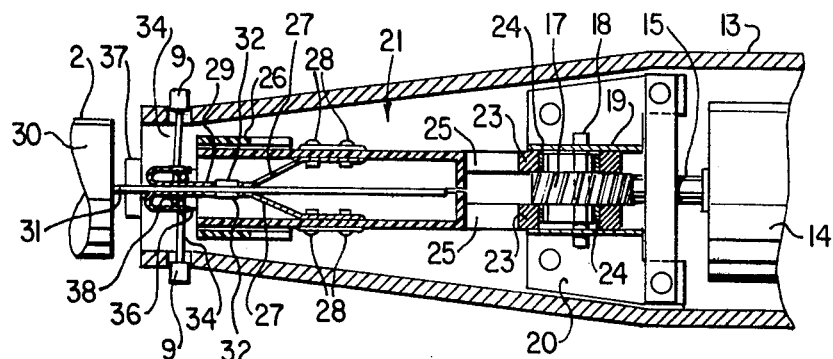
FIG. 4 is a longitudinal sectional view of a portion of the scaler of FIGS. 1 to 3, illustrating a blade holder, transmission and drive.
Figure 5:
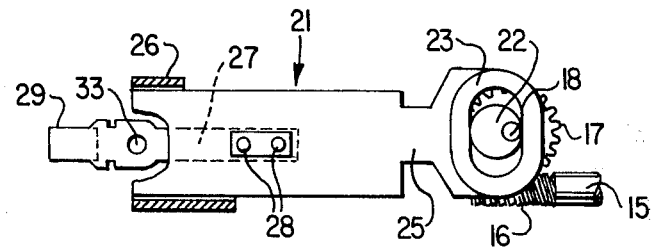
FIG. 5 is a cross section taken generally along line 5—5 of FIG. 4, with parts omitted.
Figure 6:
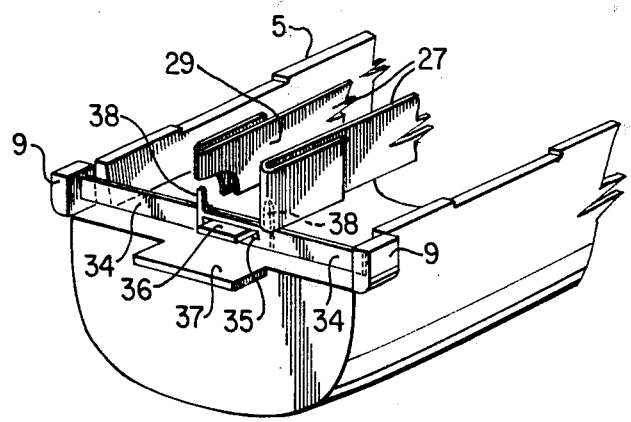
FIG. 6 is a perspective view from the front of a blade release mechanism of the scaler of the FIGS. 1 to 5.

The large rear end 13 of the casing 1 houses a small electric motor 14 for rotating a forwardly extending drive shaft 15. The leading end of the drive shaft is provided with threads 16 for engaging the teeth on a toothed wheel 17. Thus, the threads 16 and the wheel 17 define a worm wheel, which defines part of a transmission for transforming rotary motion around an axis (the longitudinal axis of the shaft 15) extending longitudinally of the casing 1 to reciprocating motion longitudinally of the casing 1. The transmission also includes a shaft 18 rotatably mounted in a bracket 19 on a transverse axis, i.e., an axis perpendicular to the longitudinal axis of the casing 1 and extending across such casing. The shaft 18 extends through and is rotatable with the toothed wheel 17. The bracket 19 has a generally inverted U-shaped cross-sectional configuration and is provided with apertured flanges 20 for mounting the bracket on supports (not shown) in the casing 1. The bracket 19 supports the transmission and a blade holder generally indicated at 21 (FIGS. 3 to 5).

An eccentric 22 is provided on the shaft 18 on each side of the toothed wheel 17 for rotation with the shaft. Elliptical sleeves 23, which define one end of the blade holder 21 are mounted on the eccentrics 22. A bushing 24 (FIG. 4) is mounted in each sleeve 23 between the sleeve and the eccentric 22. An arm 25 is integral with and extends forwardly from each sleeve to the front or leading end of the blade holder 21. The blade holder 21 is a split, rectangular plastic frame, which is slidably mounted in the bracket 19 and in an inverted U-shaped front bracket 26. When the motor 14 is actuated, the blade holder 21 reciprocates in the brackets 19 and 26 in a line extending longitudinally of the casing 1.

A pair of spring steel blade retaining arms 27 are mounted in the blade holder frame. Each arm 27 is mounted on one side of the frame by means of rivets 28. The arms are stepped, with outer ends 29 normally bearing against each other. The blade 2 includes a head 30 and a flat shank 31 for engagement by the arms 27. A pin 32 extends outwardly from each side of the shank 31. When the shank 31 is inserted into the front end 3 of the casing 1 between the arms 27, the arms separate. Then the pins 32 enter holes 33 (one shown in FIG. 5) in the arms 27, the arms spring together, locking the blade in position.

In order to release the blade 2, it is necessary to separate the outer ends 29 of the arms 27. The arms 27 are separated by generally L-shaped blade release arms 34 (FIGS. 4 and 6) connected to and extending inwardly from the buttons 9. Each arm 34 includes a slot 35 for receiving a guide lug 36 extending outwardly from the bottom of the bracket 26 above a lug 37 on the front end of the lower portion 5 of the casing 1. The lug 37 extends into a groove (not shown) in the annular front end of the upper portion 4 of the casing 1 when the upper and lower portions 4 and 5 are being interconnected for aligning such portions. Inner ends 38 of the arms 34 extend upwardly between the U-shaped outer ends of the arms 27. Thus, when the buttons 9 are pushed, the arms 34 slide toward each other pushing the arms 27 apart to release the shank 31 of the blade 2. When the buttons are released, the arms 27 press against each other, moving the buttons 9 outwardly.

Referring now to FIGS. 7 to 11, the head 30 of the blade 2 includes a cylindrical end containing one end of the shank 31, and a forwardly flaring body 39. As illustrated in FIGS. 1 and 8, the flaring body 39 is bowed upwardly and connected to the casing 1 in such a manner that cutting edge 40 at the front end thereof is perpendicular to the direction of reciprocation of the blade, i.e., normal to the longitudinal axis of the casing 1. The basic cutting edge 40 (FIGS. 1 and 7) is straight and scalloped, with a plurality of shallow concave cutting areas 41, separated by straight cutting areas 42. Alternative shapes of cutting edges are concave edge 43 (FIG. 9), and concave and scalloped edges 44 and 45 (FIGS. 10 and 11).

With conventional fish scalers of the type described hereinbefore, the scales of fish are cut. In the present case, when the switch 6 is moved to the "on" position, the motor 14 and the transmission cause the blade holder 21 and the blade 2 to reciprocate rapidly in the direction of the longitudinal axis of the casing 1. When the blade 2 is moved across a fish, the cutting edge dislodges the scales, i.e., the scales are dislodged by vibration rather than by cutting.

While the device described hereinbefore includes a cord for connecting the motor to a source of electrical power, it will be appreciated that the device could be battery operated. While the blade can be formed of a variety of materials, a hard plastic is preferred.

What I claim is:

1. A fish scaler comprising a casing having a longitudinal axis; motor means in said casing; shaft means in said casing for driving by said motor means; transmission means in said casing for changing rotary motion of said shaft into longitudinal reciprocating motion along said axis; blade holder means connected to said transmission means; scaling blade means for mounting in said blade holder means, and a scaling edge at the distal end of said blade means extending transverse to said axis, whereby actuation of said motor results in reciprocating motion of said blade means for dislodging fish scales.

2. A fish scaler according to claim 1, wherein said cutting edge is concave.

3. A fish scaler according to claim 1, wherein said cutting edge is substantially straight with a plurality of concave cutting surfaces spaced apart along the width thereof.

4. A fish scaler according to claim 2, wherein said cutting edge is scalloped.

5. A fish scaler according to claim 2, 3 or 4, wherein said blade means is bowed transversely to conform generally to the shape of the body of a fish.

* * * * *